D. WORDEN.
SAW ATTACHMENT.
APPLICATION FILED OCT. 1, 1917.
1,312,661.
Patented Aug. 12, 1919.
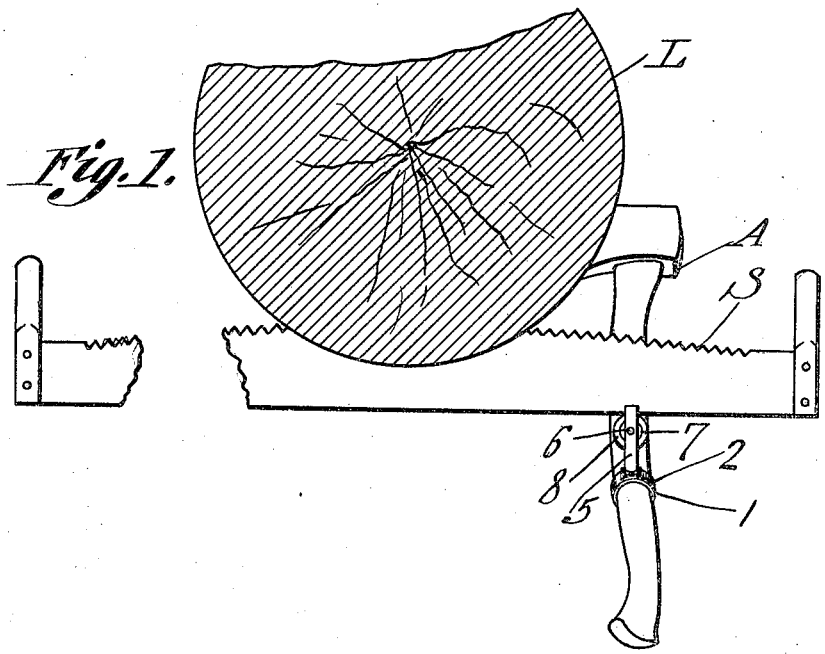
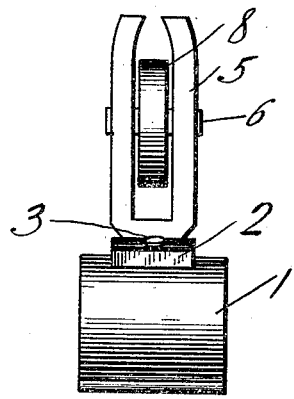
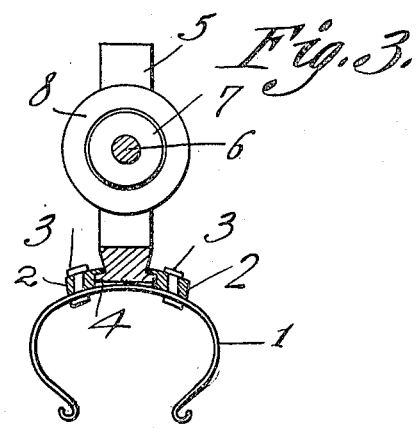
D. Worden
Inventor
Witnesses
by
Attorneys

UNITED STATES PATENT OFFICE.

DUDLEY WORDEN, OF FERNDALE, WASHINGTON.

SAW ATTACHMENT.

1,312,661. Specification of Letters Patent. Patented Aug. 12, 1919.

Application filed October 1, 1917. Serial No. 194,242.

*To all whom it may concern:*

Be it known that I, DUDLEY WORDEN, a citizen of the United States, residing at Ferndale, in the county of Whatcom and State of Washington, have invented a new and useful Saw Attachment, of which the following is a specification.

The subject of this invention is a saw attachment wherein a rotary saw supporting element turns between saw guides, and the objects of the invention are, first, to provide means for supporting a saw when sawing vertically upward, second, to provide an attachment which may be secured to an ax handle and support a saw when undercutting a log, third, to provide a simple and efficient saw attachment.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

A preferred form of the invention is shown in the accompanying drawing, wherein:—

Figure 1 is a view in front elevation of the device showing the same in operative relation to an ax and saw;

Fig. 2 is a side elevation.

Fig. 3 is a front elevation partly in section.

Referring to the drawing by characters of reference:

A log which is to be sawed is represented at L, and an ax with its blade embedded in the log is seen at A, while the saw is shown at S.

An irregularly curved resilient clip 1 is adapted to straddle the handle of the ax A. A plate 2 is secured by rivets 3, or otherwise, to the clip 1 and this plate is apertured and countersunk, as shown most clearly in Fig. 3, to pivotally secure the headed end 4 of a bifurcated standard 5 which rises from said plate and clip. A pin 6 is secured in the prongs of the standard 5 and a disk or collar 7 is rigidly mounted on the pin between the prongs. A ring 8 surrounds the collar 7, upon which it turns.

The ends of the prongs of standard 5 may be slightly converged, as seen most clearly in Fig. 2, to properly engage the sides of the blade of a saw.

In practice the device is operated as follows:

When a log is resting in such a position that it must be cut from below, an ax is sunk into the log adjacent the point at which the cut is to be made. The handle of the ax must, of course, extend beyond the point of cut and below the log.

The clip is then straddled on the ax handle and the saw blade positioned between the prongs of the standard, as seen in Fig. 1. The ax handle has sufficient resiliency to properly hold the saw up to its work, while the turning of the ring 8 permits the saw to be reciprocated with ease.

Having thus described the invention, what is claimed as new and sought by Letters-Patent, is:—

In a detachable saw guide, a spring-clip member, a plate secured to the clip intermediate its length, and having an opening therein, standards terminating in a head, said head being positioned in the opening of the plate to allow a pivotal movement of the head, a pin positioned between the standards, a collar mounted on the pin, and a roller mounted on the collar to rotate between the standards.

In testimony that I claim the foregoing as my own, I have hereto affixed my signature in the presence of two witnesses.

DUDLEY WORDEN.

Witnesses:
 Mrs. THEODOSIA WILLIAMS,
 S. C. CULVER.

Copies of this patent may be obtained for five cents each, by addressing the "Commissioner of Patents, Washington, D. C."